United States Patent
Wendling (10) Patent No.: US 6,701,161 B1
(45) Date of Patent: Mar. 2, 2004

(54) MULTIMEDIA UNIT

(75) Inventor: Frank Wendling, Ehrbach (DE)

(73) Assignee: Nokia Mobile Phones Ltd., Espoo (FI)

( * ) Notice: Subject to any disclaimer, the term of this patent is extended or adjusted under 35 U.S.C. 154(b) by 451 days.

(21) Appl. No.: 09/640,248

(22) Filed: Aug. 16, 2000

(30) Foreign Application Priority Data

Aug. 20, 1999 (DE) ......................... 199 39 631

(51) Int. Cl.[7] .................... H04M 1/00; H04L 12/66
(52) U.S. Cl. ................ 455/556.1; 455/556.2; 455/456.5; 455/557; 455/550; 370/352; 370/522
(58) Field of Search ............... 455/456, 556, 455/557, 550, 553.1, 575.9, 345, 556.1, 556.2; 370/352, 522

(56) References Cited

U.S. PATENT DOCUMENTS

| | | | |
|---|---|---|---|
| 4,787,040 A | | 11/1988 | Ames et al. ............... 701/1 |
| 5,086,510 A | * | 2/1992 | Guenther et al. ......... 455/575.9 |
| 5,404,443 A | | 4/1995 | Hirata ..................... 725/75 |
| 5,537,673 A | * | 7/1996 | Nagashima et al. ........ 455/346 |
| 5,794,164 A | | 8/1998 | Beckert et al. ............. 701/33 |
| 6,091,956 A | * | 7/2000 | Hollenberg ............. 455/456.5 |
| 6,202,008 B1 | * | 3/2001 | Beckert et al. ............. 701/33 |
| 6,405,049 B2 | * | 6/2002 | Herrod et al. ............. 455/517 |

FOREIGN PATENT DOCUMENTS

| | | |
|---|---|---|
| DE | 3346370 | 7/1985 |
| DE | 3514438 | 9/1986 |
| DE | 4033832 | 6/1991 |
| DE | 4317385 | 12/1993 |
| DE | 19531415 | 2/1997 |
| DE | 19604052 | 9/1998 |
| DE | 69317475 | 10/1998 |
| DE | 19705636 | 12/1998 |
| DE | 19741854 | 3/1999 |
| DE | 19803178 | 7/1999 |
| EP | 0483956 | 5/1992 |
| WO | 9519030 | 7/1995 |
| WO | 9857434 | 12/1998 |

* cited by examiner

*Primary Examiner*—William Trost
*Assistant Examiner*—Sharad Rampuria

(57) ABSTRACT

The invention concerns a multimedia unit with a removable operating section (OS) for a vehicle. The multimedia unit controls and operates functional components for different media and is designed to be permanently installed in the instrument panel of a vehicle. The multimedia unit achieves good protection in a simple manner against theft and unauthorized use, and simplifies the operation of a multimedia unit with any number of functional components. The multimedia unit has a user surface of the removable operating section (OS), which also contains an antenna A2, a microphone MI 1 and a telephone loudspeaker and, is designed as a touch sensitive screen (TS), which in cooperation with a processor in the operating section (OS) and a control and display software generates an interactive user surface (F1) which is adapted to the respective functional component to be operated.

A significant advantage of the invention is that a single operating section of the multifunctional control device not only enables the operation of different functional components in the vehicle, but that it even generates user surfaces which correspond in their optical appearance to that of the known functional components.

14 Claims, 3 Drawing Sheets

MULTIMEDIA UNIT

The invention concerns a multimedia unit with a removable operating section for a vehicle. The multimedia unit controls and operates functional components for different media and is designed to be permanently installed in the instrument panel of a vehicle. One entertainment electronics component, such as a car radio with or without an audio player for example, is combined with at least one component for mobile telecommunication and/or traffic telematics. In this document one functional component for mobile telecommunication is a radio telephone for every type of mobile and cellular radio networks with or without devices for transmitting and receiving text and/or graphic data such as telefax, e-mail and other data. By contrast the components for traffic telematics enable the interactive traffic guidance of the vehicle, for example route guidance with means for determining location and speed, and for traffic reports. Furthermore the traffic telematics automatically call for help in emergency situations. The telematics component for example uses the known Global Positioning System (GPS).

In this case the "functional component" concept denotes functional switching elements of the multimedia unit which are required to use a medium such as the radio telephone. Several functional components can then be combined in a mechanical unit, for example a circuit board or even an integrated circuit. A functional component can also contain separate functional switching elements in different housings.

In addition to a car radio, progress in the development of radio telephones and telematics allows other single devices or equipment parts for use of the new media to be permanently installation in automobiles. For reasons of traffic safety and because it is also technically required by advanced equipment features, mobile telephones are often hard-wired as a car telephone in a vehicle. This enables the joint usage of both strong sound reproduction during hands-free telephoning and the supply of vehicle power to raise the transmitting power. In addition the peripheral elements needed in the vehicle, such as car antennas, handset and the device for hands-free telephoning can be connected to the car telephone without any problems.

Since telematics require a GPS receiver, various sensors in the vehicle as well as an evaluation device for the available information, hard-wiring is also required for them. In this way additional, expensive technical equipment is installed in the vehicle and must be protected against theft like conventional car radios, and against unauthorized use in the case of radio telephones.

Patent specification EP 0 483 956 B1 (NOKIA, UK) describes a multimedia unit with a radio telephone and a cellular radio telephone. In addition to the telephone handset, the radio telephone and the car radio are integrated in a housing which can be mounted in the standard opening for conventional car radio installation. Both devices have certain circuit parts in common, such as the audio part with loudspeakers, a display for the operating conditions and the power supply. When the handset is lifted, the radio telephone switches the car radio to mute. A separate processor controls both the car radio and the cellular radio telephone. The activation elements for the car radio are located on the front of the joint housing, those of the radio telephone on the handset. Measures that protect against theft or unauthorized use are not revealed.

Conventional car radios from different manufacturers are often equipped with a removable operating section that contains activation elements for user inputs. The receiver or an integrated or connected reproduction part can only be operated through this operating section, so that if the user takes the operating section with him, the remaining part of the installation becomes useless. However the operating section is also useless by itself, so that there is little incentive for the user to remove it from the car radio after parking and take it with him.

To correct this deficiency, multimedia units are known among others from specifications DE 43 17 385 A1 (corresponds to U.S. 5,537,673, Pioneer, JP) and DE 197 41 584 A1 (Bosch, DE) wherein a car radio is protected against theft by having a removable operating section with an integrated radio telephone. I.e. in addition to the car radio's operating elements, the operating section comprises a complete telephone circuit for a radio network, as well as a telephone module with a battery for power, a microphone, loudspeaker and antenna. In this way the operating section by itself has its own useful function for the user.

In both cases the operating sections have mechanical keys which are alternately used to select programs in the car radio and to dial the radio telephone. The operating sections therefore comprise a considerable number of keys for every operating mode, which are not needed for the respective medium function being used and have therefore no function. On the one hand this limits the utilization features to a few basic functions and/or one the other hand leads to a complicated control surface. Beyond that each operating section contains a display with its own driver, which shows the operating modes of both the car radio and the radio telephone, regardless of whether the latter is connected to the car radio. Both the operating section and the multimedia unit have their own microprocessor. The car radio only operates if both processors communicate with each other after coupling the operating section.

Since the handset is usually held vertical during telephoning, one variation according to specification DE 43 17 385 A1 shows that the rear of the operating section has another control surface with mechanical input keys, which are arranged and lettered for vertical operation. By contrast the solution according to DE 197 41 584 A1 makes this easier by arranging the letters on the keys at an angle. Beyond that in this solution the direction of the displayed characters can be switched between vertical and horizontal.

Known devices for installation into the standardized opening for a conventional car radio only have a limited surface for the keyboard. This leads to considerable limitations of the equipment features and/or to poor ability to operate, especially in the vehicle. The operating section either contains many small and hard to see individual keys, or only a few keys some of which have multiple functions and are difficult to identify. When all the components are jointly protected it is also difficult to assemble or later add to the functional components of a multimedia unit in accordance with the wishes of a vehicle buyer.

Also known are compact radio telephones which instead of the mechanical activation elements and the conventional display contain a screen with touch sensors, a so-called touch screen. This screen almost fills the entire operating section surface. The 1.5 GHz "Digital Cellular Phone DP-211" can be cited as an example and is produced by the JP Pioneer Company for the Japanese market (Internet document: http://www.pioneer.cojp/press/release3.html). Compared to conventional telephone functions which can be executed on a conventional digital keyboard with limited alphanumeric read-out, the touch screen also performs additional telephone functions. A menu-drive which constantly updates the read-out and activation elements, makes it possible to input the many characters required by the Japanese language, such as for example the Kanji characters, into the on-board telephone directory.

The same company also produces a type ND-K100 mounting kit for installing the compact radio telephone DP-211 on the instrument panel of a vehicle. A basic device without any further functional component, which is built into the standard opening of a conventional car radio and replaces it, makes hands-free telephoning possible in the vehicle and uses the vehicle's power supply to charge the telephone battery. The mounting kit includes a cordless remote control which is attached to the steering wheel. When the vehicle is moving, a sensor blocks the manual activation elements of the radio telephone. If the DP-211 is located on the basic device of the vehicle, the character display switches between portrait and landscape format. Although the DP-211 radio telephone is a fully operational mobile telephone, it lacks all functions for other media. Radio reception requires a conventional car radio in a separate opening. Each device thus needs its own theft protection.

Starting with the known solutions, the object of the invention is to configure a multimedia unit for a vehicle so that it achieves good protection against theft and unauthorized use in a simple manner for any functional components equipment, and simplifies the operation of the multimedia unit.

The invention starts with a multimedia unit of functional components for different media, which comprises at least one basic device and a removable operating section. The latter has a control surface with activation elements and at least one display element for starting or displaying operating modes, and its own processor system with separate software to drive functional components. A radio telephone is integrated into he removable operating section to enable a vehicle user to take the operating section with him when he leaves the vehicle, thus protecting all the functional components against theft and unauthorized use. Irrespective of another processor system used as the main system in the basic device, the radio telephone in the operating section can be used in a mobile radio network.

The object of the invention is achieved in that the control surface of the removable operating section is a touch sensitive display which, in conjunction with the processor in the operating section and a control and display software, generates at least one interactive user surface which is adapted to the respective functional component being turned on. Each user surface essentially only has those activation and/or display elements that refer to the respective functional component being turned on.

A significant advantage of the invention therefore is that as a multi-functional control device, a single operating section not only makes it possible to operate different functional components in the vehicle, but that it even generates user surfaces whose visible appearance corresponds to that of the known functional components. On the one hand this means that in its removed condition the operating section is a fully operational radio telephone with respect to its function and external appearance, with a user surface that the user already knows from conventional devices. On the other hand, upon request the operating section's processor generates in the vehicle a full-featured user surface for other functional components of the vehicle, which is no longer reminiscent of a telephone. For example the vehicle user does not turn on his car radio with an expanded and unfamiliar telephone keyboard, but instead he sees the familiar picture of a car radio with a clear user surface.

The processor system in the operating section can operate independently of the main system in the basic device, and in conjunction with the touch sensitive screen directly controls the telephone module with all the added features. Beyond that it controls at least indirectly the functional components of the multimedia unit being protected To that end and according to the invention a non-volatile memory contains additional control and display software which intelligently integrates the user surfaces for any other functional component. The control and display software advantageously comprises individual software components for the corresponding functional components of the multimedia unit. This has the advantage that on the one hand only the control and display software, for which corresponding functional components are installed in the vehicle in accordance with the equipment purchased by the vehicle buyer, is installed or activated in the operating section. On the other hand after the multimedia unit is expanded, control and display software for new functional components can be installed in the existing operating section without problems by adding hardware and/or software, or the software can be updated by means of overwriting. In this way optimally configured user surfaces are always available for operating the multimedia unit. Even the generation of user surfaces for functional components which were still unknown at the time the multimedia unit was manufactured, is possible through retrofit installation.

According to another configuration of the invention the processor system has software means in the operating section, which also generate corresponding user surfaces and input dialogs for different media when the unit is removed.

According to another advantageous configuration of the invention, data communication via a wireless connection takes place between the processor system in the operating section and the main system. To that end an infrared or a radio interface can be used for example. The latter is available at least in Europe in the 2.4 GHz band under the name of "Bluetooth" without any license for industry, science and medicine (ISM application). This enables the operating section to program and store presetting of functional components from outside of the vehicle and without being coupled to the basic device, or even interactively from another section of the vehicle. For example the travel route can easily be programmed for the traffic guidance system by a second person before the start or during the journey.

Since the mentioned radio interface has a range of about 10 meters, according to another feature of the invention the operating section of the multimedia unit can also be designed as a remote control transmitter for additional functions in connection with a vehicle. For example such additional functions can be activating the door and trunk locks in vehicles, activating/deactivating the theft protection, turning on the vehicle lights, brake lights and such for testing from the outside, or activating garage doors. This provides high security for the theft protection, because an interactive data exchange takes place before the respective function is activated between the basic device and the operating section, and a highly secure code system is used for reciprocal identification.

The invention will be explained in the following by means of an embodiment. The corresponding figures are.

BEST MODE FOR CARRYING OUT THE INVENTION

Figure 1:
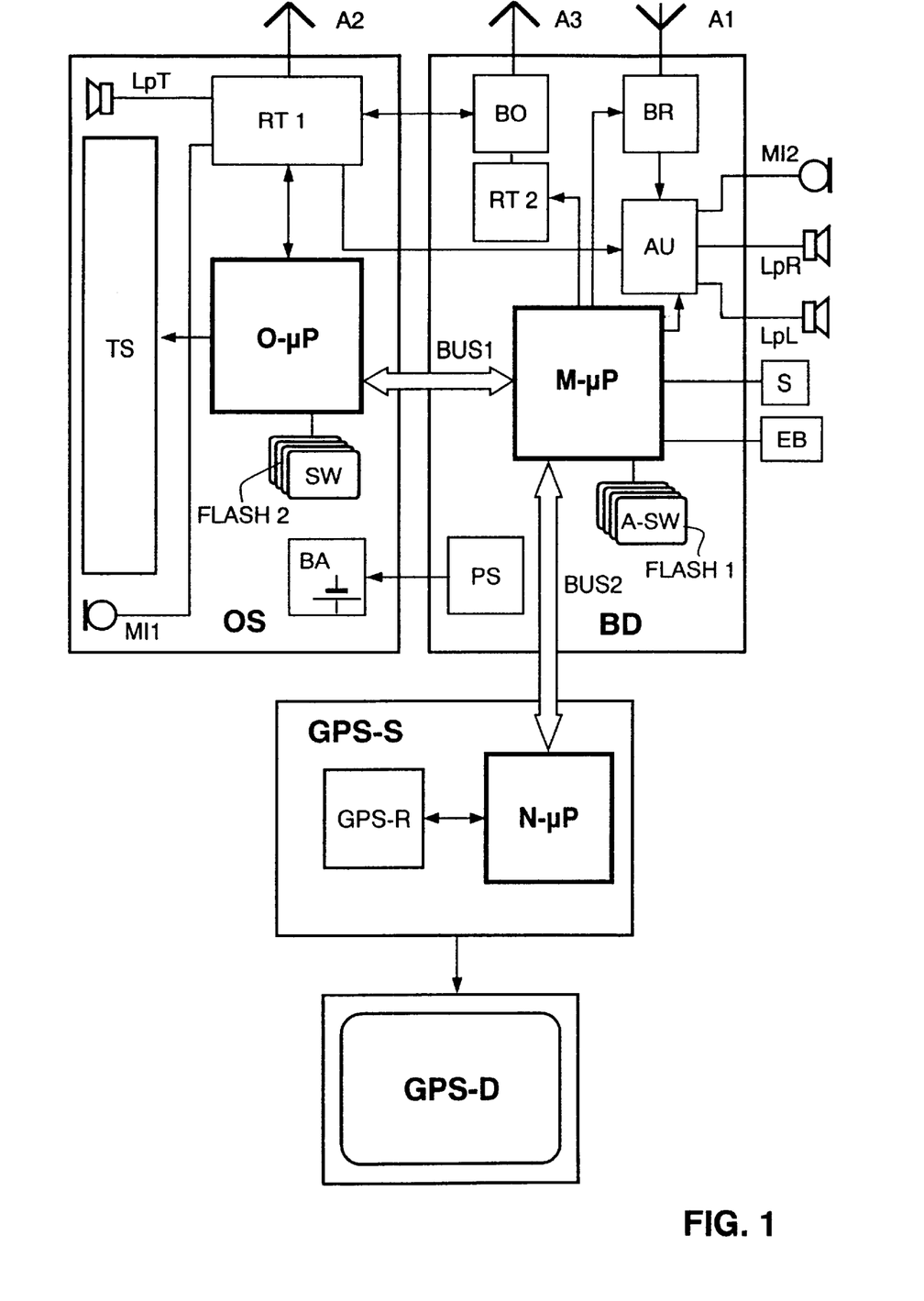
FIG. 1 a block circuit diagram for a multimedia unit.

FIG. 1 shows a block circuit diagram for a possible design of a multimedia unit. A multimedia unit with only a few functional components is shown for easy viewing. In practice however this number can be increased to any extent. The illustrated principle of a solution is able to protect all functional components equally.

The upper left part (sic) of the drawing shows a basic device BD for permanent installation in the instrument panel of a vehicle. Among other things the basic device BD comprises a radio module BR with a receiving antenna A1 and an audio module AU. The audio module AU is connected to stereo loudspeakers LpR and LpL and has power amplifiers for the audio reproduction, the usual means for adjusting the sound reproduction and a CD/CD-ROM drive. In the present example both the radio module BR and the audio part AU are essentially controlled by a main processor M-□P. Instead of a single main processor M-□P, several specially designed individual processors can be used which separately perform assignments for individual functional components under the control of a processor.

In addition to a working memory which is not shown in the figures, the main processor M-□P is also equipped for example with a non-volatile read/write flash memory FLASH 1. They are called the main system in the following. Among other things the non-volatile memory FLASH 1 contains a package with programming software A-SW for the radio reception. On the one hand it automatically switches on radio stations and on the other evaluates information which accompanies the program and arrives via a radio channel, such as traffic radio information ARI, the radio data system RDS and the traffic message channel TMC. It also secures data for a station memory. The circuit explained so far corresponds to the structure of a car radio and in the sense of this description represents a functional component. Beyond that the non-volatile memory FLASH 1 in the present example contains among other things programming software A-WS which together with the audio part AU and the CD/CD-ROM drive forms a functional component "CD-player". However neither of the functional components contains means for communicating with the user and are therefore useless by themselves.

In contrast to known solutions, the main processor M-□P in the basic device BD in conjunction with a navigation device GPS-D, the radio telephone and/or the CD/CD-ROM drive form the functional component "traffic guidance system". To that end the main processor M-□P is connected to a module of a telematics provider for identification of the vehicle's owner, an emergency SIM card, and to the navigation device GPS-D via another data BUS 2. Upon request by the main processor M-□P, the navigation device GPS-D provides the current local vehicle position and contains a satellite receiver GPS-R for GPS signals as well as a navigation processor N-□P which evaluates these signals and computes the current vehicle position. The main processor M-□P requests data for a desired travel route from a CD-ROM or via a radio telephone data connection, and uses the current location to transmit information about further travel to the driver by optical and/or acoustical means. Nor does this functional component contain means for communicating with the user either and is therefore also useless by itself.

To drive all the mentioned functional components absolutely requires the exchange of data between the main processor M-□P and another processor O-□P, which among other things is driven by control and display software SW in accordance with the functional components of the vehicle.

The processor O-□P of the invention and a touch sensitive screen TS are located in a operating section OS which can be removed from the basic device BD and is connected to a non-volatile memory FLASH 2 which in contrast to the FLASH 1 of the main processor M-MP contains control and display software SW for all functional components of the multimedia unit. The main system and the processor system in the operating section OS contain software for reciprocal identification to ensure that the functional components can only operate with the corresponding operating section OS.

The control and display software SW advantageously includes separately installed software components to enable different ways of equipping the multimedia unit with functional components, simple adaptation during retrofitting and subsequent updating. An after-sales service shop can update and add to the control and display software SW in the processor system of the operating section OS at any time via the data BUS 1. For updating, the non-volatile memory in this case a ROM can of course be replaced. The operating section OS also includes a transmitter/receiver module RT 1 to which a housing antenna A2, a telephone loudspeaker LpT and a microphone MI 1 are connected. Together with the processor O-MP, the touch sensitive screen TS and the battery BA, they make it possible to use the operating section OS as a radio telephone, independently of the basic device BD. Control of the transmitter/receiver module RT 1 can also be executed by a processor specially designed for telecommunications, which functions as a co-processor for processor O-MP.

As is the case with known solutions, in the coupled condition the battery is charged by the power supply PS of the basic device BD.

It is known that the establishment of a telephone connection via a mobile network requires a network operator module, a user SIM card to identify the telephone subscriber The operating section OS also contains this module and essentially represents a fully operational mobile radio telephone with all the added features; as is usual with conventional mobile telephones it has a user surface without activation elements which do not perform any function during telephoning. Both inside and outside of the vehicle, the telephone with the same service facility and the same user data base can only operate through an authorized access. Therefore removing the operating section OS also protects the user SIM card against theft and misuse.

Since the housing antenna A2 of the operating section OS is located at an unfavorable place for transmission when it is coupled inside the vehicle, it is separated from the transmitter/receiver module RT 1 during coupling and a connection to an HF driver BO is established. This increases the transmission output and establishes the telephone connection with the help of a vehicle antenna A3, which is located in a particularly favorable transmitting /receiving area and makes a significantly better transmission possible. An automatic antenna selector switch can be placed at the outlet of the HF driver BO for choosing between several vehicle antennas, e.g. a main antenna an emergency antenna.

The transmitter/receiver module RT 1 is furthermore connected to the audio part AU. This makes hands-free telephoning possible via the stereo loudspeakers LpR and LpL and a second microphone MI 2 AU, to avoid distracting the driver during driving. Since the processor O-MP essentially controls the functional component "car telephone", secure protection is also provided in this case if the element is removed.

It must always be possible to make emergency and help request calls and/or to transmit vehicle data from the vehicle. The establishment of a telephone and/or data connection to an emergency service or a telematics provider takes place irrespective of whether the operating section OS is coupled to the basic device BD. To that end the main processor M-MP establishes a corresponding connection with the help of the emergency SIM card, a second transmitter/receiver module RT 2 and the HF driver BO, therefore independently of the presence of the operating section OS and its settings. The main processor M-MP is connected to sensors S which automatically establish a telephone connection for an emergency and help request call if the vehicle is in an emergency situation. In that case the loudspeakers LpR, LpL and the microphone MI 2 of the audio part AU are used to establish voice communication.

The basic device BD also has a mechanical emergency call button. This can also be used to manually establish a connection for an emergency and help request call, independently of the operating section OS. In connection with the navigation device GPS-D, the current vehicle location and the identification of the vehicle owner can be transmitted to the telematics provider even if the operating section OS has been separated from the basic device BD or the user SIM card has been removed. This enables a search and locating the vehicle after an accident or vehicle theft, without any assistance from the passengers.

Figure 2:
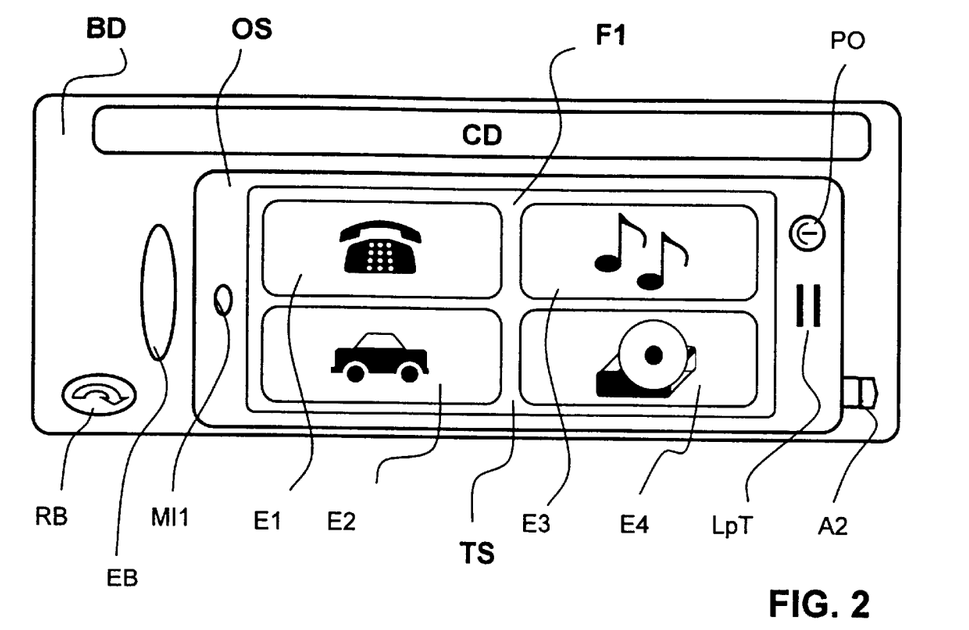
FIG. 2 a first top view of the multimedia unit's basic device with the removable operating section and the touch sensitive screen, which generates a first user surface for the basic mode of the unit.
Figure 3:
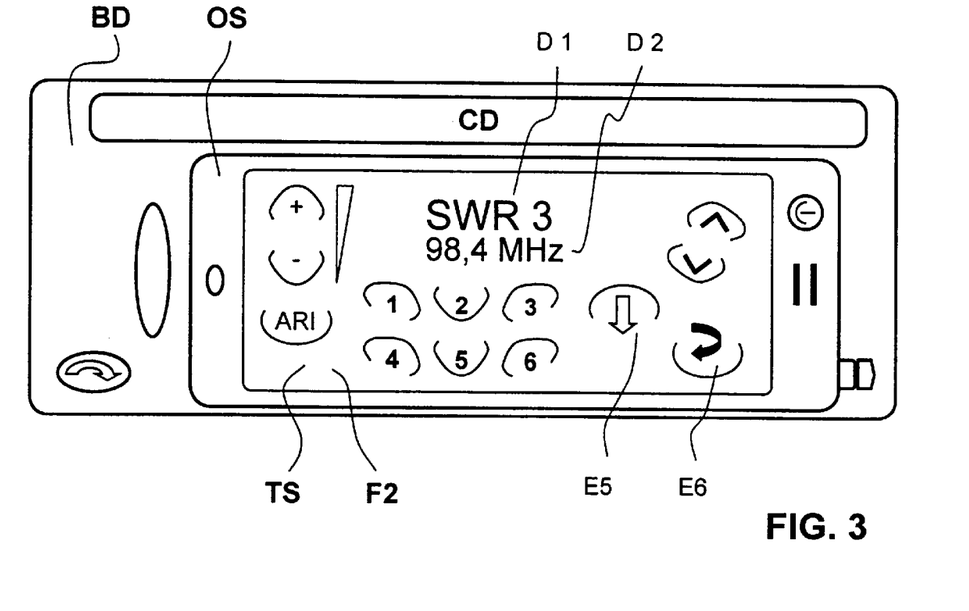
FIG. 3 a second top view of the basic device with the removable operating section and the touch sensitive screen, which generates a user surface for the radio reception.
Figures 4A, 4B:
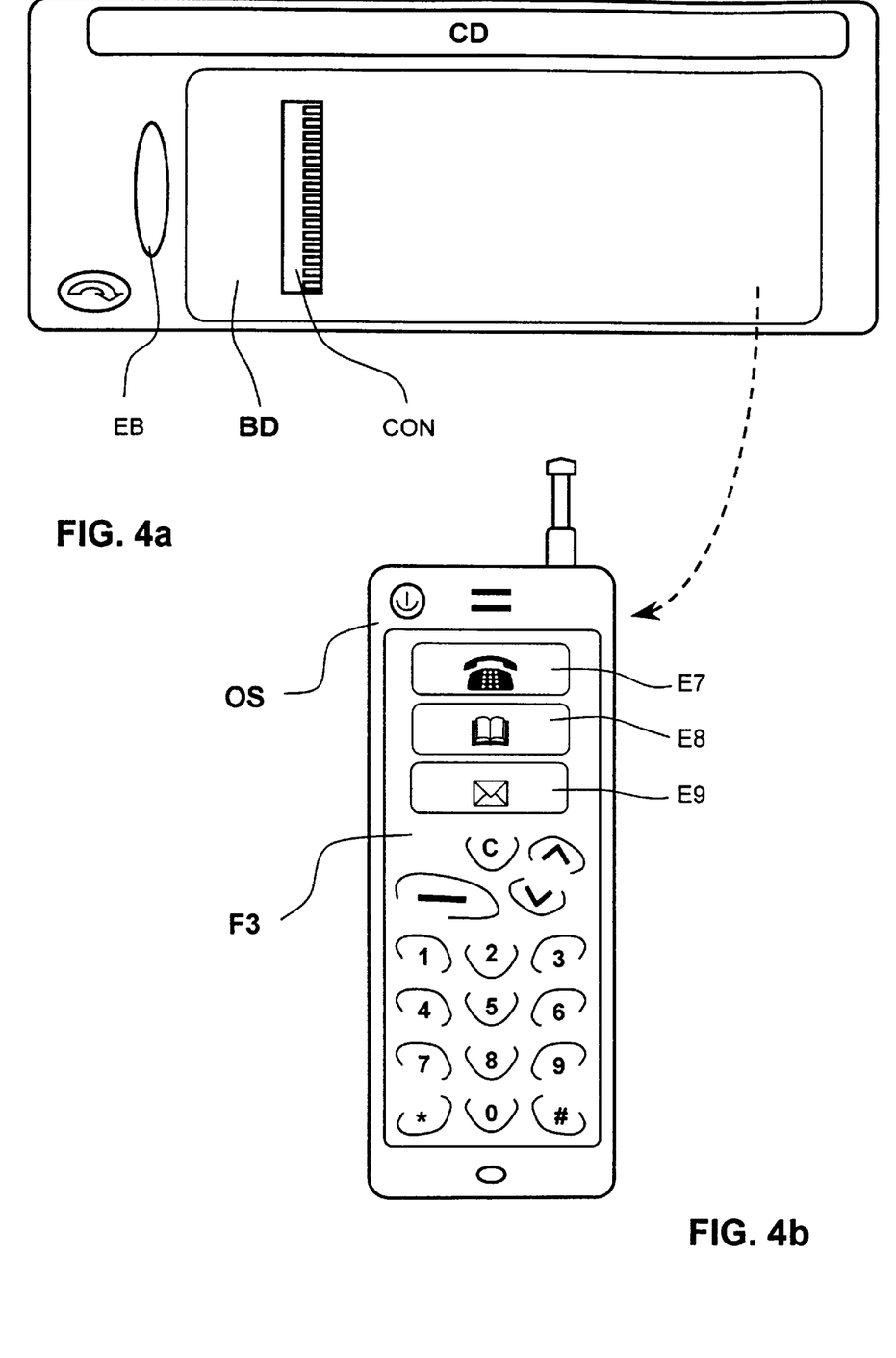
FIG. 4a a top view of the basic unit without the operating section.
FIG. 4b a top view of the removed operating section where the touch sensitive screen generates a user surface for a radio telephone.

FIGS. 2 and 3 are top views of the basic device BD of the multimedia unit with the coupled operating section OS. In addition to the operating section OS, the front face of the basic device BD has a load flap for the CD/CD-ROM drive CD, a release button RB to unlatch the operating section OS holder, and an emergency call button EB. The display of the touch sensitive screen TS occupies most of the operating section OS surface. In addition the operating section OS has a housing antenna A2, a mechanical on-off switch PO, and inputs for the microphone MI 1 and telephone loudspeaker LpT FIG. 4a is a top view of the basic device BD of the multimedia unit without the operating section OS. Electrical contacts CON can be seen which electrically interconnect the basic device BD and the operating section OS. The contacts CON provide all the connections shown in FIG. 1, such as the connection to the HF driver BO, the connection to the audio part AU, the power supply PS and the data BUS 1. A telephone connection to an emergency service or to a telematics provider can be established with the emergency call button EB irrespective of whether the operating section OS is connected to the basic device BD.

As shown in FIGS. 2, 3 and 4b, the display software SW with the help of the touch sensitive screen TS generates its own interactive user surface F1, F2, F3 for each functional component, where each one is adapted to the functional component being used. After it is coupled to the basic device BD, the processor O-MP generates a first interactive user surface F1. It provides a main menu for selecting a functional component, so that other interactive user surfaces F2, F3 can be generated for the touch sensitive screen TS to operate the selected functional component. The user surface F1 displays activation elements E1, E2, E3, E4 for selecting one of the functional components "Car telephone" (E1), "Traffic telematics" (E2), "Car radio" (E3) and "CD player" (E4). Additional control and display software SW must be installed if the multimedia unit is to be expanded by one functional component, for example "TV reception". Both the operating section OS and the basic device BD contain an operating system which updates its own configuration when functional components are added, so that the processor 0-MP reorganizes the structure of the interactive user surface F1 and inserts a fifth activation element to call up the functional component "TV reception". If necessary the first user surface F1 can also call up other submenus. In that case the functional components "Car radio" (E3) and "CD player" (E4) can be combined in a submenu for example and the activation element E4 can be configured to select "TV reception".

FIG. 3 shows a user surface F2 which is generated by the processor O-MP after the activation element E3 is activated. In that case the touch sensitive screen TS is used to switch the "Car radio" on. Instead of activation elements E1 to E4, the user surface F2 displays those that are needed for the radio reception. Beyond that display elements D1 and D2 are generated to display the switched on radio reception and other activation elements E5 and E6 for changing the submenus or returning to the main menu. When the number of activation elements is reduced in a not illustrated submenu, another interactive user surface exhibits large surface display elements to reflect traffic information from a traffic message channel TMC for example.

FIG. 4b shows the interactive user surface F3 which automatically switches on when the operating section OS is connected. In contrast to the user surface F2, it displays the typical activation elements of a mobile telephone. Here the touch sensitive screen TS changes the reading characters on the user surface F3 from horizontal to vertical. The usual display area of telephone settings contains other activation elements E7 to E9. They are used as selection keys for the submenus "Telephoning", "Personal telephone directory" and "E-mail". After a corresponding submenu has been selected, the structure of the user surface F3 is adapted further to the requirements of in-vehicle operation.

The invention is not only limited to the illustrated example. Both the installation of control and display software in the processor system of the operating section OS for generating interactive user surfaces, and the mentioned recognition software for the reciprocal identification of the main system in the basic device BD and the processor system, on the one hand provide ample protection for all functional components that are installed in the vehicle when the operating section OS is removed after the vehicle is parked. On the other hand the simple configuring possibility allows to adapt to the different ways the multimedia unit can be equipped, and provides very good operating features and simple operation.

What is claimed is:

1. A multimedia unit with functional components (RT, BR, AU, GPS-S) for using different media in a vehicle, which includes at least one basic device (BD) and a removable operating section (OS) and where the operating section (OS) comprises:
   a radio telephone which can be used independently of the basic device (BD),
   a control surface with activation elements (E1 to E9) and at least one display element (D1,D2) for turning on or displaying operating modes of the functional components (RT,BR,AU,GPS-S), and a processor system (O-μP, FLASH 2) with separate control and display software (SW) for operating functional components (RT,BR,AU, GPS-S), characterized in that:

the control surface is a touch sensitive screen (TS) which, in conjunction with the processor system (O-μP, FLASH 2) and the control and display software (SW), generates an interactive user surface (F1,F2,F3) which is adapted to the functional component to be switched on in such an intelligent manner, that the latter only has those activation elements (E1 to E8, D1, D2) which refer to the functional components (RT, BR, AU, GPS-S) being switched on, wherein the functional components include the radio telephone.

2. A multimedia unit as claimed in claim 1, characterized in that the processor system (O-MP, FLASH 2) can operate independently of a main system (M-☐P, FLASH 1) in the basic device (BD), and in conjunction with the touch sensitive screen (TS) directly controls the telephone module (RT) and controls at least indirectly the operation and display for the functional components (RT, BR, AU, GPS-S) of the multimedia unit.

3. A multimedia unit as claimed in claim 1, characterized in that the control and display software (SW) advantageously contains individual software components for the corresponding functional components of the multimedia unit, which are installed with the functional components (RT, BR, AU, GPS-S) in accordance with the extent of the multimedia unit equipment.

4. A multimedia unit as claimed in claim 3, characterized in that the operating section (OS) has means whereby the installed control and display software (SW) can be added to and expanded for individual functional components.

5. A multimedia unit as claimed in claim 1, characterized in that at least the processor system (O-μMP, FLASH 2) of the operating section (OS) and the main system (M-μMP, FLASH 1) of the basic device (BD) have recognition software for reciprocal identification.

6. A multimedia unit as claimed in claim 1, characterized in that the basic device (BD) contains means (EB, S, M-μMP, RT 2, BO, A3) to establish a radio telephone connection to a service which can make help and/or emergency calls without the cooperation of the operating section (OS).

7. A multimedia unit as claimed in claim 1, characterized in that after the operating section (OS) is coupled to the basic device (BD), the processor system (O-μMP, FLASH 2) provides a first interactive user surface (F1) with a main menu from which a functional component (RT, BR, AU, GPS-S) can be selected, so that other interactive user surfaces (F2, F3) can then be called up for the touch sensitive screen (TS) to operate the selected functional component, where the surface structure, functionality and appearance are optimally adapted for the selected functional component (RT, BR, AU, GPS-S).

8. A multimedia unit as claimed in claim 1, characterized in that when the operating section (OS) is removed from the basic device (BD), the processor system (O-μMP, FLASH 2) adapts the structure and the appearance of the interactive user surface (F1, F2) to the user surface (F3) that is familiar to a radio telephone user.

9. A multimedia unit as claimed in claim 8, characterized in that when the operating section (OS) is removed from the basic device (BD), the touch sensitive screen (TS) changes the reading characters on the user surface (F3) from horizontal to vertical.

10. A multimedia unit as claimed in claim 1, characterized in that the processor system (O-μMP, FLASH 2) contains software means (SW) which also provide the corresponding user surfaces (F2, F3) for different functional components (RT, BR, AU, GPS-S) in the removed mode, so that presetting can be programmed and stored without coupling to the basic device (BD).

11. A multimedia unit as claimed in claim 10, characterized in that data communication between the main system in the basic device (BD) and the processor system in the operating section (OS) takes place via a wireless data connection (BUS 1), so that the uncoupled operating section (OS) can be used to interactively operate components in the multimedia unit.

12. A multimedia unit as claimed in claim 11, characterized in that a radio interface is used for the data communication between the basic device (BD) and the operating section (OS).

13. A multimedia unit as claimed in claim 11, characterized in that the operating section (OS) is also designed as an interactive remotely controlled transmitter for other additional functions in connection with the vehicle.

14. A multimedia unit as claimed in claim 1, characterized in that data communication between the main system in the basic device (BD) and the processor system in the operating section (OS) takes place via a wireless data connection (BUS 1), so that the uncoupled operating section (OS) can be used to interactively operate components in the multimedia unit.

* * * * *

UNITED STATES PATENT AND TRADEMARK OFFICE
CERTIFICATE OF CORRECTION

PATENT NO. : 6,701,161 B1
DATED : March 2, 2004
INVENTOR(S) : Wendling

It is certified that error appears in the above-identified patent and that said Letters Patent is hereby corrected as shown below:

Column 5,
Line 18, please cancel "upper left part (sic)" and substitute -- lower left part -- therefor;
Line 28, cancel "M-☐P" in both instances and substitute -- M-$\mu$P --; and
Lines 34, 54, 58, 62, 65 and 67, cancel "M-☐P" and substitute -- M-$\mu$P --.

Column 6,
Line 9, please cancel "M-☐P" and "O-☐P" and substitute -- M-$\mu$P -- and -- O-$\mu$P -- respectively;
Line 12, cancel " "O-MP" and substitute -- O-$\mu$M --;
Line 16, cancel "M-MP" and substitute -- M-$\mu$P --; and
Lines 34 and 40, cancel "O-MP" and substitute -- O-$\mu$P --.

Column 7,
Line 7, please cancel "O-MP" and substitute -- O-$\mu$P -- therefor;
Lines 17 and 21, cancel "M-MP" and substitute -- M-$\mu$P --.

Column 8,
Line 13, please cancel "0-MP" and substitute -- O-$\mu$P -- therefor; and
Line 21, cancel "O-MP" and substitute -- O-$\mu$P --.

Column 9,
Line 19, please cancel "(O-MP, FLASH 2)" and substitute -- (O-$\mu$P, FLASH 2) -- therefor;
Line 20, please cancel "(M-☐P, FLASH 1)" and substitute -- (M-$\mu$P, FLASH 1) -- therefor;
Line 38, please cancel "(O-$\mu$MP, FLASH 2)" and substitute -- (O-$\mu$P, FLASH 2) -- therefor;
Lines 39-40, please cancel "(M-$\mu$MP, FLASH 1)" and substitute -- (M-$\mu$P, FLASH 1) -- therefor;
Lines 43-44, please cancel "(EB, S, M-$\mu$MP, RT 2, BO, A3)" and substitute -- (EB, S, M-$\mu$P, RT 2, BO, A3) -- therefor; and
Line 50, please cancel "(O-$\mu$MP, FLASH 2)" and substitute -- (O-$\mu$P, FLASH 2) -- therefor.

UNITED STATES PATENT AND TRADEMARK OFFICE
CERTIFICATE OF CORRECTION

PATENT NO. : 6,701,161 B1
DATED : March 2, 2004
INVENTOR(S) : Wendling

It is certified that error appears in the above-identified patent and that said Letters Patent is hereby corrected as shown below:

Column 10,
Lines 11 and 21, please cancel "(O-$\mu$MP, FLASH 2)" and substitute -- (O-$\mu$P, FLASH 2) -- therefor.

Signed and Sealed this

Thirteenth Day of July, 2004

JON W. DUDAS
*Acting Director of the United States Patent and Trademark Office*